United States Patent
Engelhart

(10) Patent No.: US 7,747,245 B2
(45) Date of Patent: *Jun. 29, 2010

(54) INTERROGATE-RESPONSE COMMUNICATION SYSTEM WITH PRIVACY INDICATION

(75) Inventor: Robert Engelhart, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/259,642

(22) Filed: Oct. 28, 2008

(65) Prior Publication Data

US 2009/0042548 A1 Feb. 12, 2009

Related U.S. Application Data

(63) Continuation of application No. 11/852,686, filed on Sep. 10, 2007, now Pat. No. 7,444,138, which is a continuation of application No. 10/367,981, filed on Feb. 19, 2003, now Pat. No. 7,280,819.

(51) Int. Cl.
*H04M 1/66* (2006.01)
*H04M 3/42* (2006.01)
*G06F 15/16* (2006.01)

(52) U.S. Cl. .................. 455/414.3; 455/414.1; 709/219

(58) Field of Classification Search .................. 455/411, 455/414.1, 550.1, 567, 435, 456.1, 67.11, 455/422.1, 435.1; 709/219; 707/9; 713/168, 713/193

See application file for complete search history.

(56) References Cited

U.S. PATENT DOCUMENTS

| 6,263,245 | B1 | 7/2001 | Snell |
| 6,275,824 | B1 | 8/2001 | O'Flaherty et al. |
| 6,327,570 | B1 | 12/2001 | Stevens |
| 6,658,568 | B1 | 12/2003 | Ginter et al. |
| 7,280,819 | B2 * | 10/2007 | Engelhart .................... 455/411 |
| 2001/0034723 | A1 | 10/2001 | Subramaniam |
| 2002/0053024 | A1 | 5/2002 | Hashimoto et al. |
| 2003/0153310 | A1 | 8/2003 | Ishii |
| 2004/0014486 | A1 | 1/2004 | Carlton et al. |
| 2004/0053637 | A1 | 3/2004 | Iida |
| 2004/0127229 | A1 | 7/2004 | Ishii |
| 2004/0127241 | A1 | 7/2004 | Shostak |
| 2008/0045196 | A1 * | 2/2008 | Engelhart ................. 455/414.3 |

OTHER PUBLICATIONS

"The Cordless Consumer", Wall Street Journal, Jul. 15, 2002.
"What's in Store", Wall Street Journal, Jul. 15, 2002.

* cited by examiner

*Primary Examiner*—Melody Mehrpour

(57) ABSTRACT

A method of and apparatus for obtaining information about a product or service offering having an associated receiver responsive to an information request or query. The method comprise providing a portable subscriber device linked with a communication network, presenting at least one selectable query for information to a subscriber via the subscriber device, selecting the at least one query for information, providing a desired privacy status of the subscriber utilizing the subscriber device, transmitting the query and the privacy status and, at the associated receiver, processing the privacy status and responding to the query by providing the requested information to the subscriber. A corresponding apparatus is also disclosed.

16 Claims, 2 Drawing Sheets

INTERROGATE-RESPONSE COMMUNICATION SYSTEM WITH PRIVACY INDICATION

CROSS REFERENCE TO RELATED APPLICATIONS

This application is a continuation of U.S. patent application Ser. No. 11/852,686, filed on Sep. 10, 2007, entitled "INTERROGATE-RESPONSE COMMUNICATION SYSTEM WITH PRIVACY INDICATION", now U.S. Pat. No. 7,444,138, which is a continuation of U.S. patent application Ser. No. 10/367,981, filed on Feb. 19, 2003, entitled "INTERROGATE-RESPONSE COMMUNICATION SYSTEM WITH PRIVACY INDICATION", now U.S. Pat. No. 7,280,819, the entirety of which is incorporated herein by reference.

The present invention relates to an interrogation-response method or system that enables a user to obtain requested information about a product or service offering, More specifically, the present invention relates to such a method or system that permits a user to maintain privacy or anonymity when requesting automatically delivered information delivery concerning a product or service.

Conventional interrogate-response systems that automatically provide product or service information to a potential customer are designed primarily for the benefit of the business establishments. It is a common goal to obtain as much information about the customer as possible, such as identity, address, email, etc., so that the establishment may develop "profiles" to better target potential buyers with unsolicited promotions or advertising. The individual customer, on the other hand, may not desire such intrusion and often weighs whether making the initial request for information is worth the inconvenience.

One such interrogate-response system is described in U.S. Pat. No. 6,327,570 issued to Stevens and entitled "Personal Business Service System and Method," which describes a private communication network to connect business establishments with participating customers. The private network includes master control points that communicate and coordinate the transfer of information between microchip-tagged products to potential customers, who are provided with a wireless communicator upon entry of the establishment. In an illustrated example, the customer obtains the wireless agent upon entry of a shopping mall and enters personal information, such as identity, email address, and the like. The wireless agent displays to the customer or communicates via varied communication means certain sales, promotions, and requested product or service information as the customer passes near the product or service. Personal information about the customer, however, is subsequently transferred to mall retailers as the customer requests information about perused products and services. Much to the dismay of the customer, he or she may become the subject of unsolicited and unwanted promotion and advertising.

SUMMARY OF THE INVENTION

In accordance with a first aspect of the invention, there is provided a method of obtaining information about a product or service offering having an associated receiver responsive to an information request comprising the steps of providing a portable subscriber device linked with a communication network, presenting at least one selectable query for information to a subscriber via the subscriber device, selecting the at least one query for information, providing a desired privacy status of the subscriber utilizing the subscriber device, transmitting the query and the privacy status and, at the associated receiver, processing the privacy status and responding to the query by providing the requested information to the subscriber.

In accordance with another aspect of the invention, an apparatus to enable a user to interrogate a product or service offering concerning desired information comprising (a) a portable user device including (i) an anonymity register to store at least an affirmative and negative privacy indication indicative of whether the user desires to remain anonymous, (ii) a query selector to select at least one query for requested information, (iii) a destination register to identify a destination to receive the requested information, and (iv) a user transmitter to transmit the privacy indication, query, and the destination; and (b) a wireless receiver associated with at least one product or service offering wherein the receiver includes a controller to effectuate a transmission of the requested information to the destination in response to the query and to store or discard the destination information in accordance with the privacy indication.

Other aspects of the invention will become apparent upon review of the following description taken in connection with the accompanying drawings. The invention, though, is pointed out with particularity by the appended claims.

DESCRIPTION OF ILLUSTRATIVE EMBODIMENTS

The present invention overcomes certain drawbacks of prior systems, in part, (i) by enabling a user to initiate a request or query for product or service information, rather than supplying such information without request, (ii) by enabling a user to select which aspect of information is desired, and (iii) importantly, by enabling the user to advise of anonymity in making the request. Preferably, the interrogate-response method and system of the present invention operates with a cellular telephone network where the user uses, e.g., aims or points, his or her cell phone as a personal communication device to communicate directly with a product microchip or responder associated with the product or service. Alternatively, the user's transmission or query may trigger the transmission of return information via the network provided by the cellular carrier. Applications include use in retail establishments that sell merchandise, provide restaurant services, or other business establishments.

Figure 1:
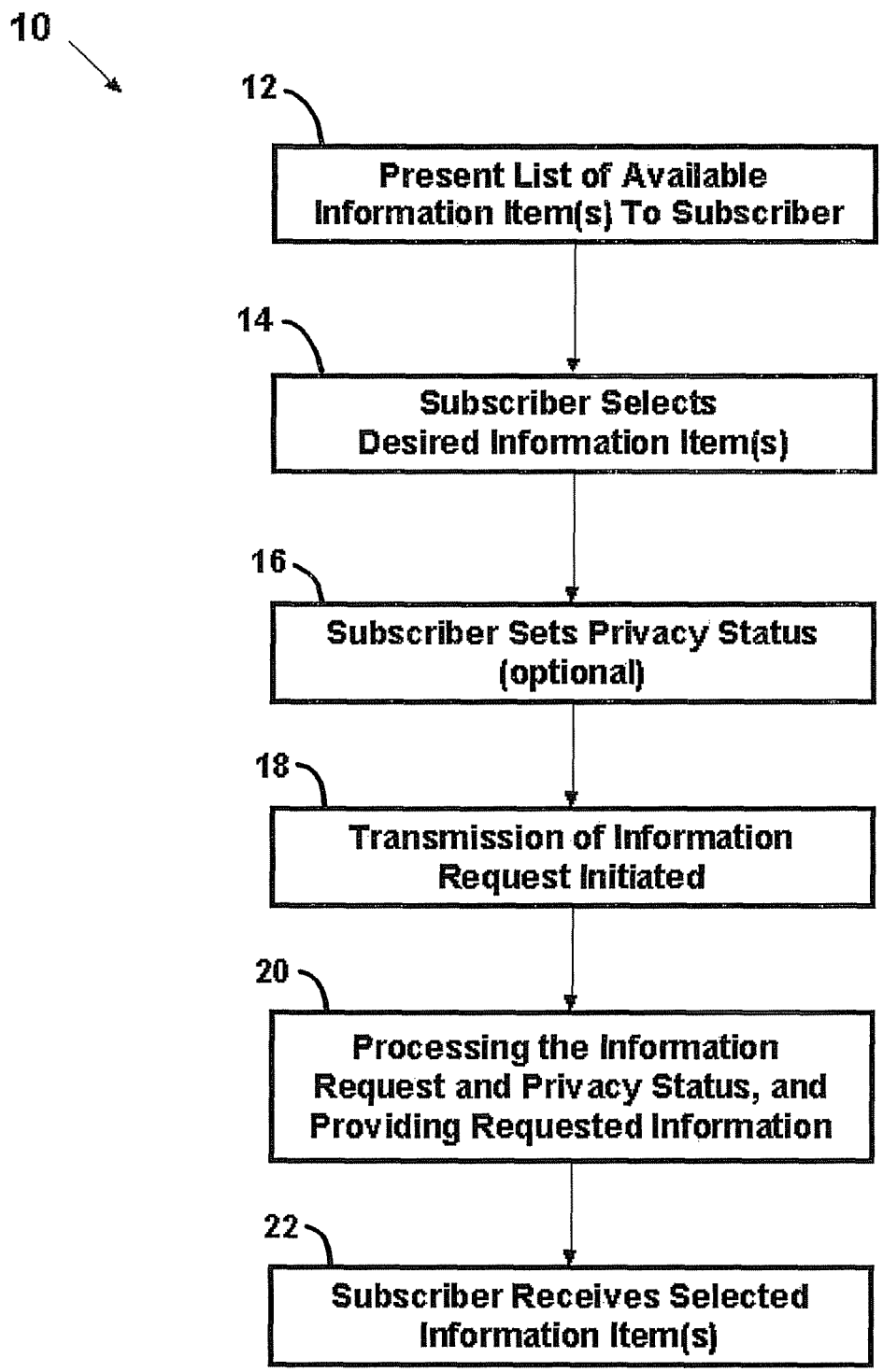
FIG. 1 depicts a simplified flow chart illustrating a method embodiment of the invention.

FIG. 1 shows a method 10 of obtaining in real time certain information about a product or service offering having an associated receiver, e.g., a microchip controller or transponder that responds to a signal transmitted by the customer's cellular telephone. The method includes a step 12 of presenting at least one query for product or service information to the cellular subscriber via his cell phone. Product or service information may include specifications, options, pricing, terms, or any other information the merchant desires to communicate to the subscriber. The display module of the cell phone may be configured to display standard information in standard format or categories, or the display unit may be configured to provide a customized display in accordance with configuration information provided by the product transponder. Preferably, the subscriber obtains the requested information by pointing his cell phone device directly at the product or service in order to issue or send the query, in which case, the cell phone may be equipped with an infrared link communicator. Other wireless communication protocols and or frequencies may also be employed, such as Bluetooth, 802.11, or other line of sight or short range communication.

After being presented with a query, the subscriber selects at step 14, one or more of the categories of information desired. According to an important aspect of the invention, the cell phone or other communicating device is provided with an anonymity switch, register, or the like to enable the subscriber to set at step 16 a privacy status prior to issuing the information request. Such anonymity register may include a buffer that temporarily stores the privacy status prior to transmission. When the subscriber at step 18 transmits the query to a responder module of the product or service offering (i.e., a display panel) that has a receiver or transponder, the transmission includes a compact customer profile including such information as a destination or reply address, the category(s) of information desired, and a privacy status indication. Upon receipt of the transmission, processing occurs at step 20. During processing, the requested information is sent at step 22 to the destination or reply address provided by the subscriber during the query transmission. The destination may include a reply email address, telephone number, street address, etc. Preferably encrypted return information is provided which may include a hypertext web document in SMS, multimedia, html or xml format, which may be supplied over a packet data network.

In addition, the transmitted privacy status is examined to determine whether to maintain subscriber identity information in confidence or for subsequent use, and/or whether to use the compact profile information only once and to discard that information after fulfillment of the subscriber's request. Subscriber identity information may include any attribute of the subscriber, including a name, return email address, the transmitted destination address, etc. Processing may include suppressing at least a portion of subscriber information in response to an affirmative privacy indication of said privacy status or acquiring/storing subscriber information in response to a negative privacy indication of said privacy status. This way, the subscriber may choose whether to prevent subsequent use or sale of his or her profile or shopping habits to other business establishments.

Figure 2:
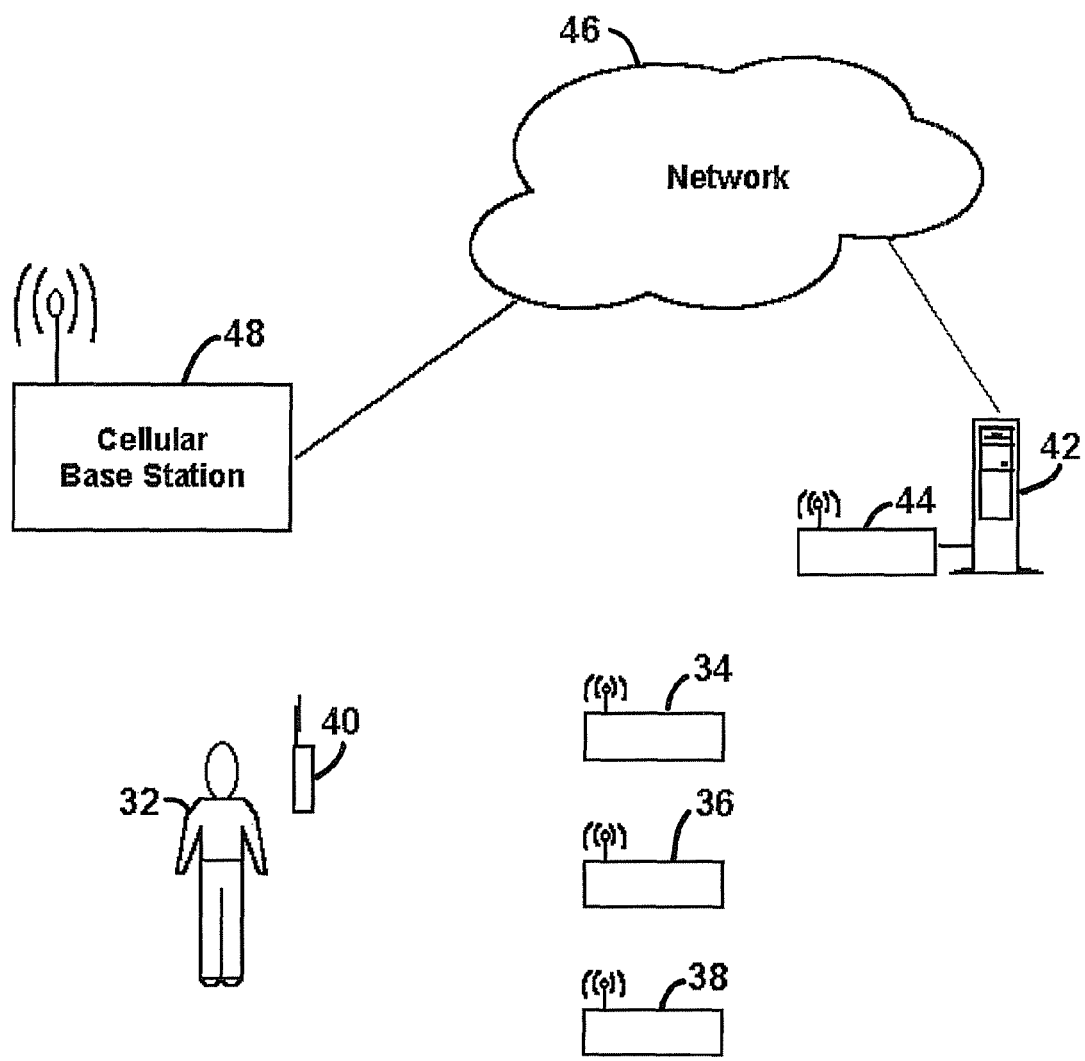
FIG. 2 is a system diagram illustration various inventive parts of the invention in apparatus form.

FIG. 2 illustrates an exemplary apparatus 40 that implements certain aspects of the invention. The apparatus 40 enables a user 32 to interrogate a product or service offering having associated receivers 34, 36, or 38 concerning selected information desired by user 32. As earlier indicated, the receivers may comprise transponders, RF or infrared receivers, or other communication devices that receive information requests or queries from a subscriber or user 32.

To issue query, the user employs a portable user device 40 having, in the illustrated embodiment, an RF antenna that transmits information and control signals to receivers or responders 34, 36, and 38 associated with various products or services. Device 40 preferably has an anonymity register, switch, or buffer to store at least an affirmative and a negative privacy indication indicative of whether the subscriber 32 desires to remain anonymous when making his or her query. Communication device 40 also includes an information selector to select an item or category of requested information. When using a cell phone as a communication device 40, selection may be accomplished by depressing certain keypad buttons while the LCD display module thereof presents selectable options to user 32. Device 40 may also comprise a personal digital assistant ("PDA"), portable handset, or other wireless device. Categories of requested information may include price, a restaurant menu, special sales, coupons, product specifications, product attributes, etc.

Device 40 also includes a destination register that identifies a destination or reply address of user 32 that is to receive the requested information. The destination address may target the cell phone itself so that the display module thereof captures (e.g., through the telephone network) and displays the requested product or service information, or may target the user's email address or voice mail mailbox. Information may be sent in html, xml, or other digital format suitable for network transmission. Preferably, the return information is sent directly to the user's communication device 40 from a transceiver of products 34, 36, or 38 via a standard information transfer protocol, such as 802.11 or Bluetooth. The wireless receivers 34, 36, and 38 associated with products or service offerings include a controller to effectuate a transmission of said requested information to a destination in response to the user's information request. The processor may also store or discard said destination information in accordance with the user's transmitted privacy indication.

Alternatively, upon receipt of the information request, the modules 34, 36, and 38 may communicate with a local server 42 via an associated wireless modem 44. Once captured by server 42, the information may be alternatively processed at the server, which sends a response via network 46 to the destination address provided by user 32. If user 32 specifies a cell phone telephone number, the network forwards that information to the hand-held communication device 40 via a conventional cellular base station 48, which maintains direct contact with communication device 40. If user 32 specifies an email address as the destination, the network 46 forwards the requested information to an email mailbox. As a practical matter, server 42 may effectuate the forwarding of requested information by virtually any conventional information transfer means.

In the preferred embodiment, communication device 40 includes an anonymity register or switch that is settable by user 32 prior to issuing a query for an information request, to indicate an affirmative or negative condition. The controller discards user information after a single use in response to an affirmative status indication and captures user information in response to a negative status indication. In addition, the device 40 includes an acknowledgment register that indicates successful receipt of the information request by modules 34, 36, or 38. This enables the user 32 to retry if a transmission request was unsuccessful.

Based on the teachings herein, it is evident that variations and changes may be made to the illustrated and described embodiments without departing from the scope of the invention. Accordingly, it is the inventor's intent that all such variations and changes be embraced by the appended claims.

I claim:

1. A method of obtaining information about a product or service offering having an associated receiver responsive to an information request, the method comprising:

presenting at least one selectable query for information to a portable subscriber device via at least one communication network;

selecting a query of the at least one selectable query for the information;

providing a subscriber privacy status utilizing the portable subscriber device; and transmitting the query and the subscriber privacy status to an associated receiver, the associated receiver for processing of the subscriber privacy status and responding to the query by providing the information to the subscriber.

2. The method of claim 1, wherein the transmitting includes transmitting a reply address that is used in the processing to provide the information to the portable subscriber device.

3. The method of claim 2, wherein the presenting includes presenting the at least one selectable query to a cellular telephone communicatively coupled with a cellular telephone network.

4. The method of claim 3, wherein the processing further includes effectuating a transmission of the information to the portable subscriber device in the form of hypertext language.

5. The method of claim 4, further comprising effectuating the transmission via a packet data network via one of email, html, or xml.

6. The method of claim 2, wherein the processing further includes suppressing at least a portion of subscriber information in response to an affirmative privacy indication of the subscriber privacy status.

7. The method of claim 6, wherein the suppressing includes discarding the reply address.

8. The method of claim 2, wherein the processing step includes acquiring subscriber information in response to a negative privacy indication of the subscriber privacy status.

9. A portable user device to enable a user to interrogate a product or service offering concerning information associated with the product or service offering, the portable user device comprising:
- an anonymity register to store at least one of an affirmative or negative user privacy indication;
- a query selector to select at least one query for requested information;
- a destination register to store destination information associated with a destination to receive the requested information; and
- a transmitter to transmit the user privacy indication, query, and the destination information to
- a wireless receiver associated with at least one product or service offering to
- effectuate a transmission of the requested information to the destination in response to the query, and
- store or discard the destination information in accordance with the user privacy indication.

10. The portable user device of claim 9, wherein the query includes one of price, product specifications, product attributes, special sales, coupons, or a restaurant menu.

11. The portable user device of claim 9, wherein the anonymity register is settable to the affirmative or negative user privacy indication prior to transmitting the query.

12. The portable user device of claim 11, wherein the destination information comprises one of a user name, an address, an email address, an IP address, a telephone number, or a message box.

13. The portable user device of claim 9, wherein the portable user device comprises a cellular telephone communicatively coupled with a cellular network.

14. The portable user device of claim 9, wherein the requested information is transmitted in a form of hypertext language.

15. The portable user device of claim 14, wherein the hypertext language is one of html, java script, or xml.

16. A responder device that provides a user with information associated with at least one product or service offering, comprising:
- a wireless receiver to receive a privacy indicator, a query requesting information associated with the at least one product or service offering, and destination information associated with a target destination to receive the information;
- a transmitter to transmit the information to the destination; and
- a controller to at least one of store or discard the destination information as a function of the privacy indicator received by the wireless receiver and effectuate transmission of the information via the transmitter.

* * * * *